No. 729,266.

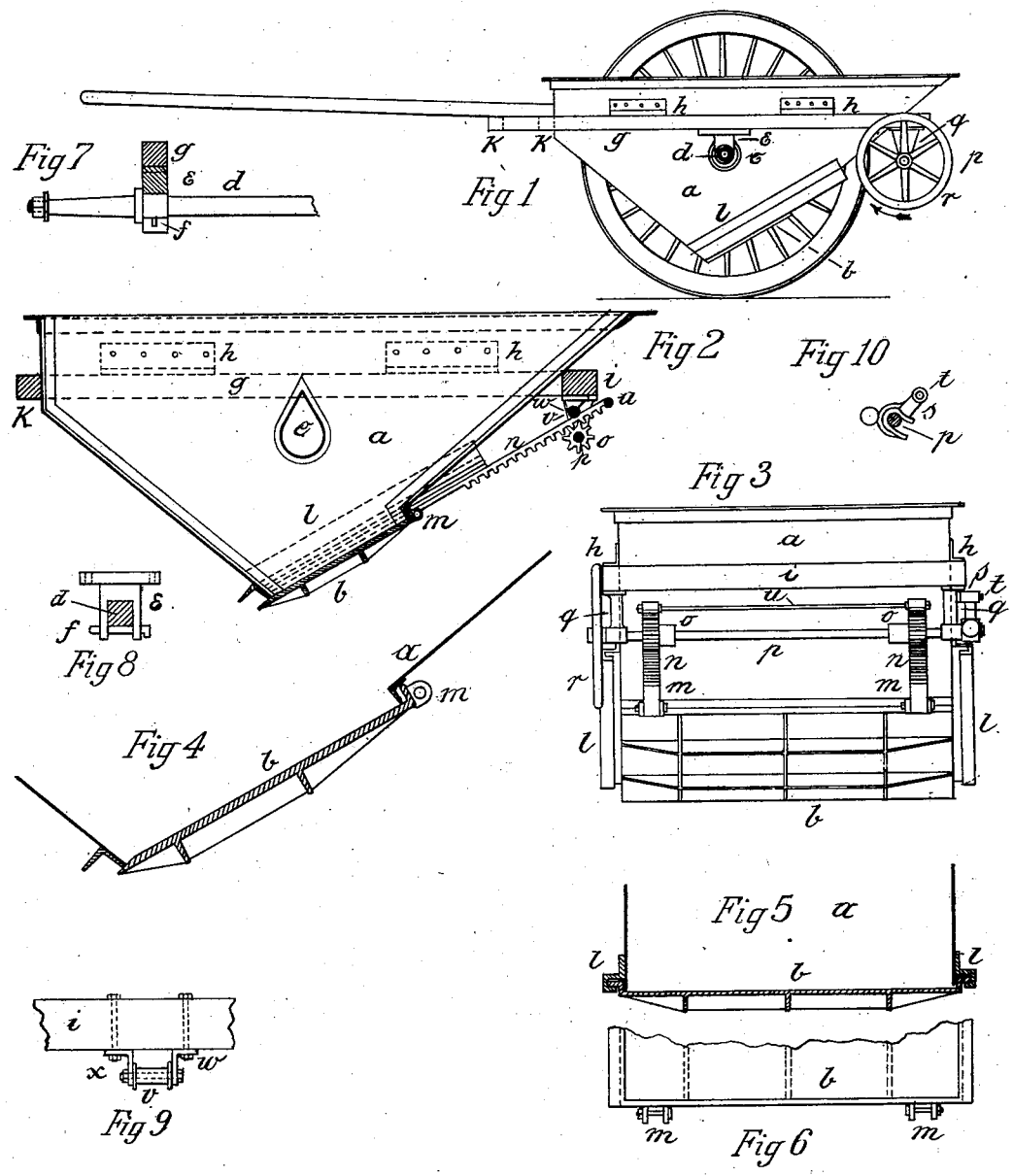

Patented May 26, 1903.

UNITED STATES PATENT OFFICE.

ADAM BRENZINGER, OF NEW YORK, N. Y.

DUMPING-CART.

SPECIFICATION forming part of Letters Patent No. 729,266, dated May 26, 1903.

Application filed December 1, 1902. Serial No. 133,487. (No model.)

*To all whom it may concern:*

Be it known that I, ADAM BRENZINGER, a citizen of the United States, residing at New York, in the county of New York and State of New York, have invented a new and useful Dump-Cart, of which the following is a specification.

This invention relates to improvements in dump-carts to be used for transporting sand, earth, gravel, ashes, &c., and for discharging and distributing them at will.

The object of this invention is to enable the operator to discharge the contents of the cart along the road at different intervals and so control the quantity of the discharge while the cart is in motion. For this purpose the invention consists of a dump-cart provided with a hopper-shaped body having converging front and rear walls and an opening in the bottom between the lower ends of said walls, a slide-door guided in ways at both sides of the opening and means for opening or closing said slide-door, as will be more fully described hereinafter and finally pointed out in the claims.

In the accompanying drawings, Figure 1 is a general arrangement and side view of the cart with the left-hand wheel taken off. Fig. 2 is a longitudinal section of the hopper-shaped body with portions of the working mechanism of my improved cart drawn on a larger scale. Fig. 3 is a rear view of the body, showing the details of my improvement. Fig. 4 is a longitudinal section of the lower part of the body, showing the slide-door in detail. Fig. 5 is a cross-section through the slide-door, showing the guideways for the sliding door in detail. Fig. 6 is a plan view of the rear part of the slide-door. Fig. 7 is a front view of the axle, showing the frame of the cart for supporting the same. Fig. 8 is a side view of the cart-support shown in section in Fig. 7. Fig. 9 is a rear view of the guide-rollers and brackets, and Fig. 10 is a detail side view of a lever working on the main shaft.

Similar letters of reference indicate corresponding parts.

Referring to the drawings, $a$ represents the hopper-shaped body, which has its front and rear walls inclined so as to slope downwardly toward the middle or converge in such a manner that the angle of friction of any material for which the cart may be used is less than the incline of the sides. The sides of the body are vertical and parallel, as shown in Fig. 3, or may also be inclined toward the middle. Between the lower ends of the front and rear inclined walls is an opening, and at the sides of the opening are guideways $l$, in which a sliding door $b$ is moved, which is provided at its upper end with projections $m$, to which are attached one or more cog rails or racks by means of bolts.

The wagon-body may be made of any suitable material, as sheet-steel, iron, and wood, and it is preferable to have all rivets and bolts countersunk.

The sides of the wagon-body are connected by a transverse tube C, wedge-shaped in cross-section and with its sharp edge pointed upwardly. The tube is of such size as to allow the widest part of the axle to pass freely through it and is placed in or near a vertical line drawn through the point of gravity of the hopper-shaped body when loaded. The axle $d$, one end of which is shown in detail in Fig. 7, has behind its wheel-seat rectangular enlargements, on which rest supports E, to which the enlargement of the axle is fastened by means of split keys $f$. These supports E may be replaced by flat steel or spiral springs, if desired. These supports E are fastened by bolts or screws to longitudinal beams $g$ $g$, which are connected to the wagon-box by angle-irons $h$ $h$ and transversely by cross-pieces $i$ $k$. The cross-pieces $i$ $k$ and beams $g$ $g$ form the frame of the cart, to which may be attached shafts for one or a pole for two horses, supplied in the usual way with whiffletrees, rings, &c.

The guide-pieces $l l$, in which the slide-door $b$ moves, extend backward far enough to prevent a tipping over of the slide-door $b$ when fully open. The two sides of the hopper-shaped body extend inside of the slide-door sufficiently to prevent sand or other contents of the body to make its way to the guideways $l$. The front inclined wall of the body extends a trifle down below the three other sides. The inside of the slide-door is beveled down just enough to slip underneath the lower end of the front inclined wall of the wagon-body to secure a tight closing of the bottom of the box. The cog rails or racks $n$, attached to the upper part of the slide-door $b$, extend upwardly to meet a corresponding cog-wheel or pinion $o$, which is fastened to a shaft $p$, supported by brackets $q$, which are bolted or secured to the under side of the frame of the cart or beams $g$. To the frame of the cart are also attached small brackets $w$, which support rollers $v$ on axles $x$, which guide the rack $n$ and hold it so as to engage with the pinion $o$. To one end of the shaft $p$ is fastened a hand-wheel or cross-lever $r$ for turning the shaft $p$. The opposite end of the shaft $p$ extends somewhat beyond the supporting-bracket $q$ and is provided at its end with a washer and pin to prevent the slipping in of the shaft $p$. A lever $s$ swings around a pivot-pin of the bracket $q$ and has a width at least of that of the pinion $o$. It is adapted to be placed between the bracket $q$ and the washer and pin at the end of the shaft $p$. The lever has a slit, which slips over the shaft $p$ when in position. When the lever is lifted out of the shaft $p$, the shaft can be shifted over, so that the pinion $o$ disengages from or clears the racks $n$. The slide-door $b$ can then be moved to and fro independently of the shaft. If more than one rack be used, they may be connected or secured by a tie-rod $v$ in order to keep them at an equal distance from each other.

The operation of my improved dump-cart is as follows: The sliding door $b$ is in its downward position and the hopper-shaped body filled with sand, gravel, or other material and the lever $s$ placed in its downward position between the end washer and the bracket $q$, so that the pinions $o$ engage with the rack $n$. The cart is then moved to the place of repairing the road, paths, &c., and the hand-wheel $r$ turned, which rotates the shaft $p$ and pinions $o$, which engage with the rack $n$ and move the same upwardly. The slide-door $b$ is thus opened to an extent depending on the amount of rotation of the shaft $p$. Moving the hand-wheel $r$ in the opposite direction will close the slide-door, so that any amount of material may be discharged from the hopper-shaped body, depending on the movement of the hand-wheel $r$. It is obvious if an entire discharge of the hopper-shaped body is desired the hand-wheel $r$ is given a complete rotation or several and the slide-door $b$ thereby moved upwardly, so as to clear the opening in the lower part of the body.

The hand-wheel $r$ may be replaced by a sprocket or gear wheel to which motion may be imparted by a chain and similar sprocket or gear wheel at the front part of the wagon or at the seat of the driver. The body $a$ may be placed between the axles of a four-wheeled vehicle, in which case the tube C is superfluous and the hand-wheel may be set wherever practical and connected with the shaft $p$ by any suitable transmission. The rear axle would then pass behind the racks, and the beams $g$ extend forwardly, so as to rest on a cross-piece on the fore part of the wagon.

The wedge-shaped tube described enables the use of a straight axle running across the body of the cart, which otherwise would have to be bent down D-shaped to clear the body of the cart, which, however, requires considerable work without a corresponding increase in strength. In fact, such a D-shaped axle is necessarily weak at the bent parts. So in using a straight axle a tube covering the same would have to be at least oval to allow some play for the vertical vibrations and motions of the axle inside of the tube, especially so if a spring should be used on which the axle rests. This oval-shape tube is made wedge-shaped with the sharp edge pointed upwardly so as to prevent any sand to remain in the top of it and so requiring the wiping off of the same when the dump-cart is emptied. The tube serves also as a brace for the two side walls and so strengthens the under side of the dump-cart and prevents the bulging out of the sides by the pressure of the material. These advantages, together with the special arrangement of the sliding door at the lower part of the hopper-shaped body, are practical and real and serve as a special recommendation to those using dump-carts of the character described.

Having thus described my invention, I claim as new and desire to secure by Letters Patent—

1. In a dump-cart, the combination, with a hopper-shaped body having converging front and rear walls, an opening in the bottom between the lower ends of said walls, and a wedge-shaped tube connecting the side walls for permitting the passage of the axle of the dump-cart, of a slide-door, guideways at both sides of said opening, and means for moving said slide-door in the guideways, substantially as set forth.

2. In a dump-cart, the combination, with a hopper-shaped body having converging front and rear walls, an opening in the bottom between the lower ends of said walls, and a wedge-shaped tube connecting the side walls for permitting the passage of the axle of the dump-cart, of a slide-door, a rack attached to the upper end of said slide-door, and means for raising or lowering the rack for opening or closing the slide-door, substantially as set forth.

3. In a dump-cart, the combination, with a hopper-shaped body having converging front and rear walls, an opening in the bottom between the lower ends of said walls, and a wedge-shaped tube connecting the side walls for permitting the passage of the axle of the dump-cart, of a slide-door, guideways for the slide-door at both sides of the opening of the hopper-shaped body, a rack attached to the upper end of the slide-door, and means for raising or lowering the rack for opening or closing the slide-door, substantially as set forth.

4. A dump-cart comprising a hopper-shaped body having converging front and rear walls, and a wedge-shaped tube connecting the side walls for permitting the passage of the axle of the dump-cart, an opening in the bottom of the hopper-shaped body between the lower ends of the converging front and rear walls, guideways at both sides of the opening, a slide-door in said guideways, a rack attached to the slide-door, a frame for supporting the hopper-shaped body, a pinion engaging said rack and supported by the frame, and means for rotating the pinion for moving the rack and opening or closing the slide-door, substantially as set forth.

5. In a dump-cart, the combination, of a hopper-shaped body having converging front and rear walls, an opening in the bottom between the lower ends of said walls, and a wedge-shaped tube connecting the side walls for permitting the passage of the axle of the dump-cart, a frame for supporting said hopper-shaped body, guideways at both sides of the opening of the hopper-shaped body, a slide-door in said guideways, a rack attached to the upper end of said slide-door, brackets supported by the frame, a shaft in said brackets, a pinion on said shaft and engaging the rack, and means for rotating said shaft and pinions for moving said rack for opening or closing the slide-door, substantially as set forth.

6. In a dump-cart, the combination, of a hopper-shaped body having converging front and rear walls, an opening in the bottom between the lower ends of said walls, and a wedge-shaped tube connecting the side walls for permitting the passage of the axle of the dump-cart, a frame for supporting the hopper-shaped body, guideways at both sides of the opening of the hopper-shaped body, a slide-door in said guideways, a rack attached to the upper end of said slide-door, rollers supported by said frame for guiding the rack, brackets also supported by the frame, a shaft in said brackets, a pinion on said shaft and engaging the rack, and means for moving said rack for opening or closing the slide-door, substantially as set forth.

7. In a dump-cart, the combination, of a hopper-shaped body having converging front and rear walls, and an opening in the bottom between the lower ends of said walls, a frame for supporting said hopper-shaped body, guideways at both sides of the opening of the hopper-shaped body, a slide-door in said guideways, a rack attached to the upper end of the slide-door, brackets supported by the frame, a shaft in said brackets, a pinion on said shaft, means for guiding the rack for engaging with the pinion on the shaft, means for imparting rotary motion to the shaft and pinion for raising or lowering the rack and door, and means for laterally shifting the shaft in the brackets for disengaging the pinion from the rack for permitting the free motion of the slide-door, substantially as set forth.

ADAM BRENZINGER.

Witnesses:
FREDERICK DREWS,
HENRY E. SMITH.